US008620856B2

(12) United States Patent
Green et al.

(10) Patent No.: US 8,620,856 B2
(45) Date of Patent: Dec. 31, 2013

(54) METHOD AND SYSTEM FOR PROVIDING A DATA EXCHANGE SERVICE PROVIDER INTERFACE

(75) Inventors: John Henry Green, Toronto (CA);
Travis Eli Nelson, San Jose, CA (US);
Piotr Przybylski, San Carlos, CA (US);
Paul Stanley, Delray Beach, FL (US);
Suraksha Vidyarthi, Fremont, CA (US)

(73) Assignee: International Business Machines Corporation, Armonk, NY (US)

(*) Notice: Subject to any disclaimer, the term of this patent is extended or adjusted under 35 U.S.C. 154(b) by 1027 days.

(21) Appl. No.: 12/016,988

(22) Filed: Jan. 18, 2008

(65) Prior Publication Data

US 2009/0187926 A1      Jul. 23, 2009

(51) Int. Cl.
*G06F 7/00*   (2006.01)

(52) U.S. Cl.
USPC ............ 707/602; 707/601; 707/604; 707/661

(58) Field of Classification Search
None
See application file for complete search history.

(56) References Cited

U.S. PATENT DOCUMENTS

| | | | | |
|---|---|---|---|---|
| 5,870,764 | A * | 2/1999 | Lo et al. .............................. | 1/1 |
| 6,742,054 | B1 * | 5/2004 | Upton, IV .......................... | 710/6 |
| 6,976,061 | B1 | 12/2005 | Sharma ......................... | 709/220 |
| 7,036,110 | B2 | 4/2006 | Jeyaraman .................... | 717/120 |
| 7,490,334 | B2 * | 2/2009 | Shapiro et al. ................ | 719/328 |
| 8,010,548 | B1 * | 8/2011 | Beddow ......................... | 707/760 |
| 2003/0023609 | A1 * | 1/2003 | Della-Libera et al. ........ | 707/101 |
| 2003/0061398 | A1 * | 3/2003 | Wilson et al. ................. | 709/318 |
| 2003/0120600 | A1 * | 6/2003 | Gurevich ......................... | 705/50 |
| 2004/0177360 | A1 | 9/2004 | Beisiegel et al. ............. | 719/316 |
| 2004/0192277 | A1 | 9/2004 | Pakarinen et al. ............ | 455/518 |
| 2005/0065800 | A1 * | 3/2005 | Green et al. ...................... | 705/1 |
| 2005/0091655 | A1 | 4/2005 | Probert et al. ................ | 719/315 |
| 2005/0132383 | A1 * | 6/2005 | Ghosh et al. .................. | 719/312 |
| 2005/0149941 | A1 | 7/2005 | Watson et al. ................. | 719/310 |
| 2005/0278452 | A1 | 12/2005 | Tankov et al. ................ | 709/230 |
| 2006/0080435 | A1 | 4/2006 | Tankov et al. ................ | 709/225 |
| 2006/0182046 | A1 * | 8/2006 | Dageville et al. ............. | 370/260 |
| 2006/0206903 | A1 * | 9/2006 | Lawrence et al. ............. | 719/313 |
| 2006/0212870 | A1 | 9/2006 | Arndt et al. ................... | 718/104 |

(Continued)

OTHER PUBLICATIONS

Maheshwari, Piyush; Kim, Ji-Ho; "Analyzing Reusability Aspects in Java Connector Architecture"; IEEE Computer Society, Proccedings of the 11th Asia-Pacific Software Engineering Conference (APSEC'04).

(Continued)

*Primary Examiner* — Mohammad S Rostami
(74) *Attorney, Agent, or Firm* — Janaki K. Davda; Konrad, Raynes, Davda & Victor LLP

(57) ABSTRACT

A computer program product comprises a computer useable medium. The computer useable medium has a computer readable program such that when the computer readable medium is executed on a computer, the computer is caused to provide a data interface between an adapter component and one or more application interface components for a runtime application. Further, the computer is caused to establish a cursor that iterates over a plurality of data objects within a data set of the runtime application. In addition, the computer is caused to establish an accessor that provides access to a data element of the data object. The computer is also caused to provide the cursor and the accessor to the adapter component so that the adapter component accesses data through the one or more application interface components of the runtime application.

22 Claims, 10 Drawing Sheets

(56) References Cited

U.S. PATENT DOCUMENTS

| | | |
|---|---|---|
| 2006/0235928 A1 | 10/2006 | Cacenco et al. ............... 709/205 |
| 2007/0011194 A1* | 1/2007 | Gurevich ................... 707/103 Y |
| 2007/0055656 A1* | 3/2007 | Tunstall-Pedoe ................. 707/3 |
| 2007/0113234 A1 | 5/2007 | Chinnappa et al. ............ 718/104 |
| 2007/0260612 A1* | 11/2007 | Papakonstantinou et al. .. 707/10 |
| 2008/0127211 A1* | 5/2008 | Belsey et al. ................. 719/315 |
| 2009/0063433 A1 | 3/2009 | Nelson et al. |
| 2009/0063956 A1 | 3/2009 | Vidyarthi et al. |
| 2009/0183144 A1 | 7/2009 | Aupperle et al. |

OTHER PUBLICATIONS

Sharma, Rahul et al. *J2EE™ Connector Architecture and Enterprise Application Integration*; Chapter 10: "Building A Resource Adapter", pp. 181-202, Dec. 14, 2001, http://safari.informit.com/0201775808.

Kartik, Bagi Sri et al.; "Seamless Network Management inPresence of Heterogeneous Management Protocols for Next Generation Networks"; IEEE Computer Society, 9th International Conference on Information Technology; 2006.

* cited by examiner

METHOD AND SYSTEM FOR PROVIDING A DATA EXCHANGE SERVICE PROVIDER INTERFACE

BACKGROUND

1. Field

This disclosure generally relates to software integration. More particularly, the disclosure relates to connectivity to Enterprise systems.

2. General Background

A variety of middleware products are currently utilized to support business software applications. Examples of such middleware products include transaction processing systems, message processing systems, and Extract, Transform, Load ("ETL") systems. The various middleware systems have different performance profiles and requirements. Some middleware systems deal with relatively small amounts of data, but need to process requests very quickly. Other middleware systems deal with very large amounts of data and need to access this data in pieces of manageable size.

As a result, a business software environment may include a large number of runtimes, which are engine, servers, or software applications performing a function that need to access data from external resources. In many cases, adapters have been developed for these products to access an external Enterprise Information System ("EIS") such as a database, transaction processing system, etc. As a result, a multitude of adapters have been built using various technologies to provide access to the same resources. This overlap provides tremendous expense, e.g., development costs and maintenance costs, for the software developer. Further, end users are exposed to inconsistencies in the tools and capabilities of the connectivity solutions provided by different products.

Current approaches do not allow for standard connectivity to Enterprise systems from different runtime environments because the current standards are defined for specific environments, e.g., Java™ Platform, Enterprise Edition ("Java™ EE"). Accordingly, these current approaches do not permit the reuse of adapters between different runtime environments, e.g., Application Server, Information Management, or System Management.

Attempts have been made to share adapters between products. However, these attempts have failed for a multitude of reasons. One reason is that the interfaces are often incompatible with one another. Further, additional infrastructure that is foreign to the software environment often needs to be utilized. In addition, data and/or format conversions, which can be costly with respect to central processing unit ("CPU") performance, may need to be utilized.

SUMMARY

In one aspect of the disclosure, a computer program product comprises a computer useable medium. The computer useable medium has a computer readable program such that when the computer readable medium is executed on a computer, the computer is caused to provide a data interface between an adapter component and one or more application interface components for a runtime application. Further, the computer is caused to establish a cursor that iterates over a plurality of data objects within a data set of the runtime application. In addition, the computer is caused to establish an accessor that provides access to a data element of the data object. The computer is also caused to provide the cursor and the accessor to the adapter component so that the adapter component accesses data through the one or more application interface components of the runtime application.

In yet another aspect of the disclosure, a process is provided. The process provides a data interface between an adapter component and one or more application interface components for a runtime application. Further, the process establishes a cursor that iterates over a plurality of data objects within a data set of the runtime application. In addition, the process establishes an accessor that provides access to a data element of the data object. Finally, the process provides the cursor and the accessor to the adapter component so that the adapter component accesses data through the one or more application interface components of the runtime application.

In another aspect of the disclosure, a system is provided. The system includes a data interface between an adapter component and one or more application interface components for a runtime application. Further, the system includes a cursor creation module that establishes a cursor that iterates over a plurality of data objects within a data set of the runtime application. In addition, the system includes an accessor creation module that establishes an accessor that provides access to a data element of the data object. The system also includes a transmission module that provides the cursor and the accessor to the adapter component so that the adapter component accesses data through the one or more application interface components of the runtime application.

DRAWINGS

The above-mentioned features of the present disclosure will become more apparent with reference to the following description taken in conjunction with the accompanying drawings wherein like reference numerals denote like elements and in which.

DETAILED DESCRIPTION

A DESPI may be utilized to define the boundaries between an Application Component and Connector Component. The DESPI is utilized for efficient transfer of data between an Application Component and a Connector Component. Accordingly, the DESPI minimizes the need to copy or canonicalize data, or to create intermediate objects solely for containing data elements.

Figure 1:
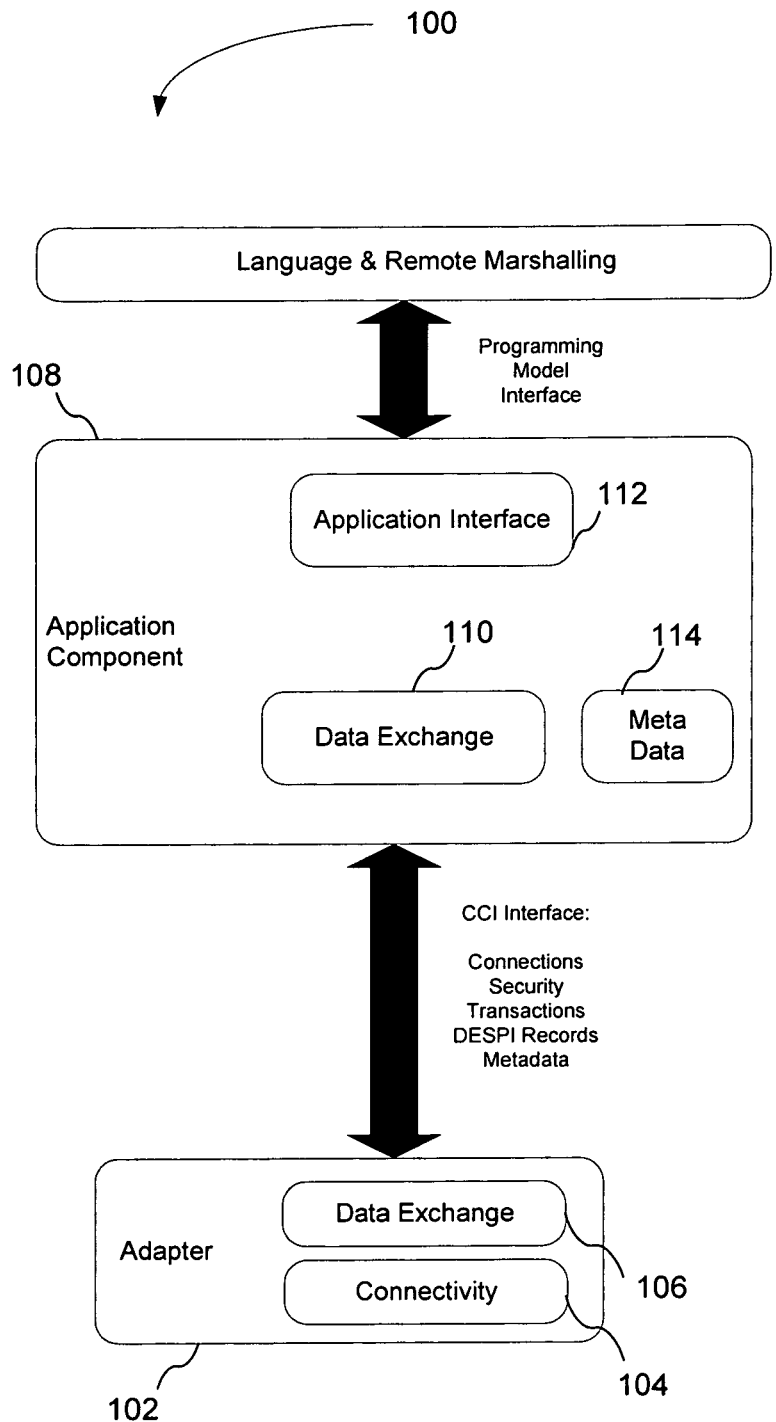
FIG. 1 illustrates an architecture component model that utilizes the Data Exchange Service Provider Interface ("DESPI").

FIG. 1 illustrates an architecture component model 100 that utilizes the DESPI. The architecture component model 100 utilizes a layered approach to allow a plurality of components to interact through a set of well-defined interfaces. Further, the componentized approach utilized in the architecture component model 100 allows for the separate and independent development of each component as well as the reuse of each component.

The architecture component model 100 may split an adapter into multiple adapter components 102. Accordingly, the adapter components 102 are not monolithic and do not impose non-native metadata, data, and calling formats on the runtimes. As a result, the adapter component 102 may be utilized with multiple runtimes.

The adapter component 102 encapsulates basic connectivity to the EIS and the exchange of the data with the EIS. The adapter component 102 can be driven by the metadata describing interactions with the EIS. In one embodiment, the adapter component 102 includes separate subcomponents for connecting to the EIS and for exchanging data. The first subcomponent is a connectivity subcomponent 104, and the second subcomponent is a data exchange subcomponent 106. In one embodiment, a single adapter component 102 may be utilized with multiple Application Interface Components 108.

The connectivity subcomponent 104 includes functionality for establishing, maintaining, and closing connections to the target EIS. Further, the connectivity subcomponent 104 provides support for transactions and security for these connections. The connectivity subcomponent 104 interacts with the specific libraries and functionality of the target EIS. The connectivity subcomponent 104 is exposed to the application interface component through standard J2EE™ Connector Architecture 1.5 ("JCA") common client interfaces ("CCI") including Connection, ConnectionFactory, Interaction and InteractionSpec for outbound, and ResourceAdapter and ActivationSpec for the inbound.

The data exchange subcomponent 106 includes functionality for passing or receiving data from the application component through the data exchange interface. This interface is format neutral and runtime neutral. Accordingly, the interface permits any kind of structured or streamed data to be moved between these components. The adapter 102 understands the data format of the EIS and is able to convert it to invocations of Data Exchange interface.

The adapter component 102 is developed by the adapter provider, who has knowledge of the target EIS, its interfaces, and its behavior. The adapter provider can be the EIS vendor, a dedicated connector vendor, or an in-house developer providing access to the required EIS.

The Application component 108 is a bridge between the runtime environment, e.g., a Middleware Application, and the adapter component 102. The Application component 108 enables invocation of the adapter from the clients by using the appropriate programming model. Further, the Application component 108 is responsible for mapping between the runtime's programming model and data format to the invocation of the adapter component 102 through the JCA CCI.

The DESPI provides the ability to support multiple data formats. DESPI allows data of arbitrary complexity to be exchanged bi-directionally between the runtime and the adapter component 102 without a need to create intermediate objects, such as Service Data Objects ("SDO") or Extensible Markup Language ("XML").

The data exchange subcomponent 110 is an implementation of data exchange interfaces in the Application component 108. Accordingly, the data exchange subcomponent 110 converts the invocations of the data exchange interfaces to runtime-specific data representations. Further, the application interface 112 is the interface that matches the runtime programming model and maps runtime-specific invocations to the invocation of the adapter 102 through CCI. In addition, the metadata 114 describes the structure of the data exchange with the EIS through the DESPI. In other words, the metadata 114 includes information about the included types and the structure of the data. The metadata 114 can also provide information to the adapter component 102 about how the data can be exchanged with the EIS.

As the data interface between the adapter component 102 and one or more Application Interface Components 108, the DESPI is configured to optimize performance. First, the DESPI is configured to access the data of the runtime environment directly, without the need to create intermediate canonical objects. Second, the DESPI is configured to permit data to be dynamically accessed in the external resource, without requiring the whole data set to be held in memory. Third, the DESPI supports streaming of data that can be read piecemeal or otherwise partitioned. As a result, the DESPI provides support both inbound and outbound directions, provides metadata such that both data binding and the adapter component 102 have a shared understanding of the structure of the data, provides support for both structured records and data streams, minimizes conversion, copying, and canonicalization, and supports arbitrarily complex data structures.

In one embodiment, the DESPI utilizes one or more cursors that iterate over a plurality of data objects within the data set of the runtime and one or more accessors that provide access to the individual data elements, e.g., fields, within an object. An example of the plurality of data objects is a series of similar data objects. Both cursor and accessors are implemented by the application component 108 and are used by the adapter component 102 to get and set the data objects and fields. From the viewpoint of the application component 102, the interface is simple and ensures that the development effort for an adapter developer is minimized.

As an example, the application component 108 implements the DataExchangeFactory interface, which follows the standard factory pattern. The application component 108 provides the adapter component with the entry points for creating cursors and accessors to the data, either for reading or writing. A cursor references a complex object, or a series of complex objects. An accessor references a field within the complex object, or an array of such fields.

These cursors and accessors point to the native data of the runtime. If the runtime utilizes SDO DataObjects, then the cursors will reference DataObjects and the Accessors will reference properties of these objects. If the runtime utilizes XML, then the cursors and accessors may reference elements and attributes within a Document Object Model ("DOM") representation. The adapter component 102 does not need to be aware of the underlying data structure as the implementation of the cursor and the accessor hide the details from the adapter component 102. For example, a single SAP™ Business Application Programming Interface ("BAPI") connector component could be equally used with an SDO, XML or any other DataExchangeFactory. Further, a single implementation of the DESPI classes for a particular runtime supports the use of any connector component. A single adapter component 102 may be utilized to access a specific resource. In addition, a single DESPI implementation for a specific data format may be utilized. Therefore, N data formats and M adapter components allows for the development of N+M components, which results in N×M connectivity options.

A metadata format common between the adapter component 102 and the application component 108 is supported to allow the structure of the data exchanged through the DESPI interface to be defined. For example, the externalized metadata definition format may be based on Service Data Objects ("SDO") specification version 2.1 and represented by the SDO Type.

In one embodiment, the metadata produced by the adapter component 102 is in the form of annotated Extensible Markup Language ("XML") schemas. The annotations contain application-specific information which the adapter 102 utilizes at runtime to associate objects or individual properties with the equivalent in the external resource. This application-specific information, or "appinfo", can be used to identify key fields, mappings to external types, or for any other purpose that the adapter dictates. The appinfo should be treated as an opaque string by all components other than the adapter 102. At runtime, definitions convey the metadata to the adapter 102. These definitions are typically constructed from the imported XML schemas. Some environments may prefer to programmatically construct the metadata from their own metadata representation, which would have been created from the original XML schemas. Any appinfo annotations in the schemas should be preserved by such environments and then provided along with the type definition for consumption by the adapter 102.

The architecture component model 100 allows a plurality of input sources available through adapters to interact with multiple runtimes, by reducing the number of distinct interfaces from M×N to 1×N and/or M×1. Further, the data exchange set of interfaces eliminates the need for an intermediate object as seen, for example, in SDO, when an intermediate SDO object needs to be built and converted to a native object if SDO is utilized to move data between an adapter and a middleware system that does not operate natively with SDO objects. In addition, the lack of a defined format for the data to be exchanged between an adapter and its client, as seen with JCA, is alleviated by the data exchange set of interfaces. Accordingly, middleware systems can much more easily adopt JCA by utilizing the data exchange set of interfaces. The architecture component model 100 is intended to support as many runtime and design environments as possible. The adapters developed from the architecture component model 100 are accessible by all runtimes. The choice of implementation language for adapters is determined by the client Application Programming Interface ("API") that the adapter component 102 utilizes to communicate with the external resource.

FIGS. 2A-2D illustrate a metadata tree 200 from which cursors and accessors may be created. The metadata tree 200 represents the structure of data. Examples of the metadata tree include an XSD, a JavaBean class, or an SDO Type.

Figure 2A:
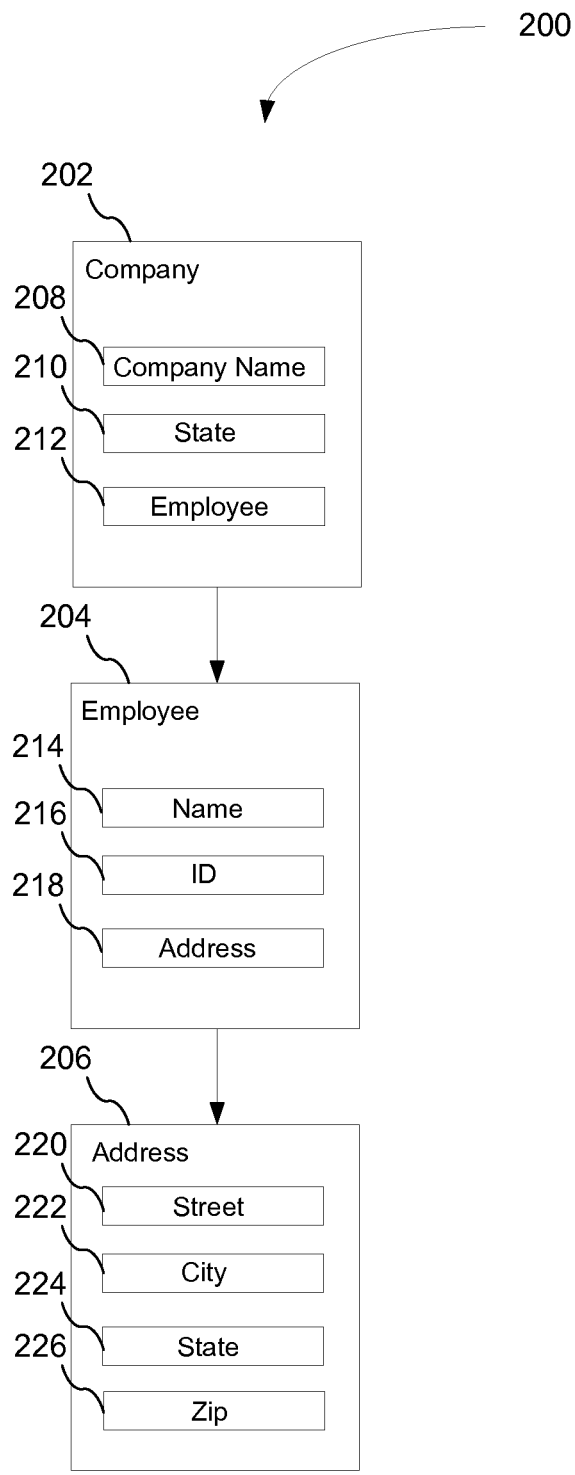
FIGS. 2A-2D illustrate a metadata tree from which cursors and accessors may be created.

FIG. 2A illustrates an example of the structure of the metadata tree 200. The metadata tree 200 may include one or more complex objects and one or more fields within each complex object. For example, the metadata tree 200 may include three complex objects: (1) a company object 202; (2) an employee object 204; and (3) an address object 206. The objects in the metadata tree 200 may include one or more child objects. For instance, the company object 202 may have multiple employee objects 204. Each of the objects in the metadata tree 200 may include fields. For example, the company object 202 may include fields such as a company name field 208, a state field 210, and an employee field 212. Further, the employee object 204 may include a name field 214, an identifier ("ID") field 216, and an address field 218. In addition, the address object 206 may include a street field 220, a city field 222, a state field 224, and a zip code field 226.

Figure 2B:
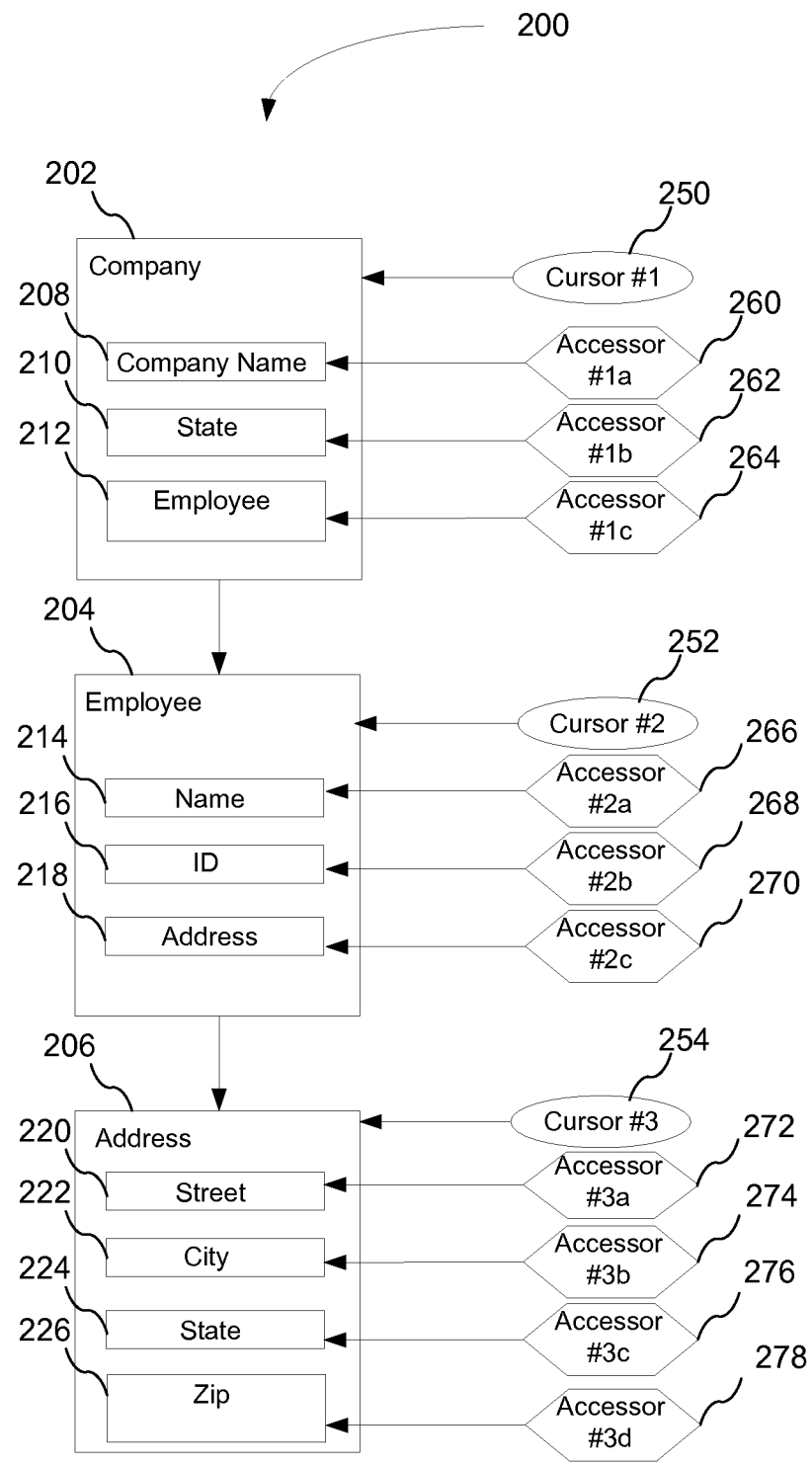

FIG. 2B illustrates the cursors and the accessors that are created for the example of the structure of the metadata tree 200 illustrated in FIG. 2. A cursor is created for each complex object. For example, a first cursor 250 is created for the company object 202, a second cursor 252 is created for the employee object 204, and a third cursor 254 is created for the address object 206. Further, each cursor contains one or more accessors. Each of the accessors references the individual fields of the object. For example, with respect to the company object 202, an accessor 1*a* 260 references the company name field 208, an accessor 1*b* 262 references the state field 210, and an accessor 1*c* 264 references an employee field 212. Further, with respect to the employee object 204, an accessor 2*a* 266 references the name field 214, an accessor 2*b* 270 references the ID field 216, and an accessor 2*c* 270 references the address field 218. In addition, with respect to the address object 206, an accessor 3*a* 272 references the street field 220, an accessor 3*b* references the city field 222, an accessor 3*c* references the state field 224, and an accessor 3*d* references the zip field 226.

Figure 2C:
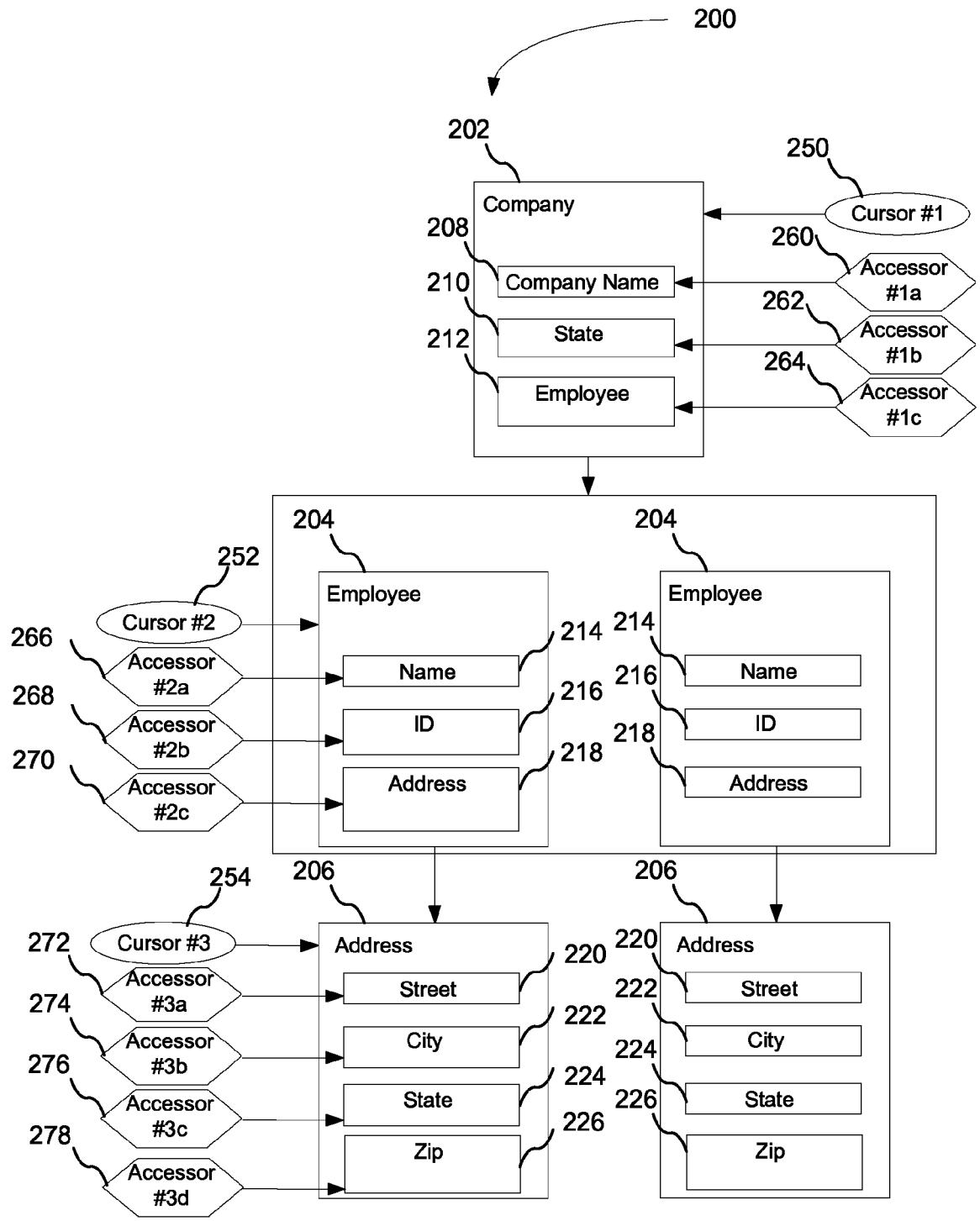

FIG. 2C illustrates the positioning of the cursors and the accessors for an example in which two employee objects are utilized. The cursors and accessors provide access to the underlying data that is bound to the DataExchangeFactory. Cursors iterate over repeating elements. The first cursor 250 points is a top-level cursor that points to the top-level object irrespective of what occurs with the lower-level objects. Initially, the second cursor 252 points to a first employee object 204, and the accessors corresponding to the second cursor 252 point to the fields of the first employee object 204. Further, the third cursor 254 points to an address object 206 associated with the first employee, and the accessors corresponding to the third cursor 254 points to the fields of the address object 206 associated with the first employee.

Figure 2D:
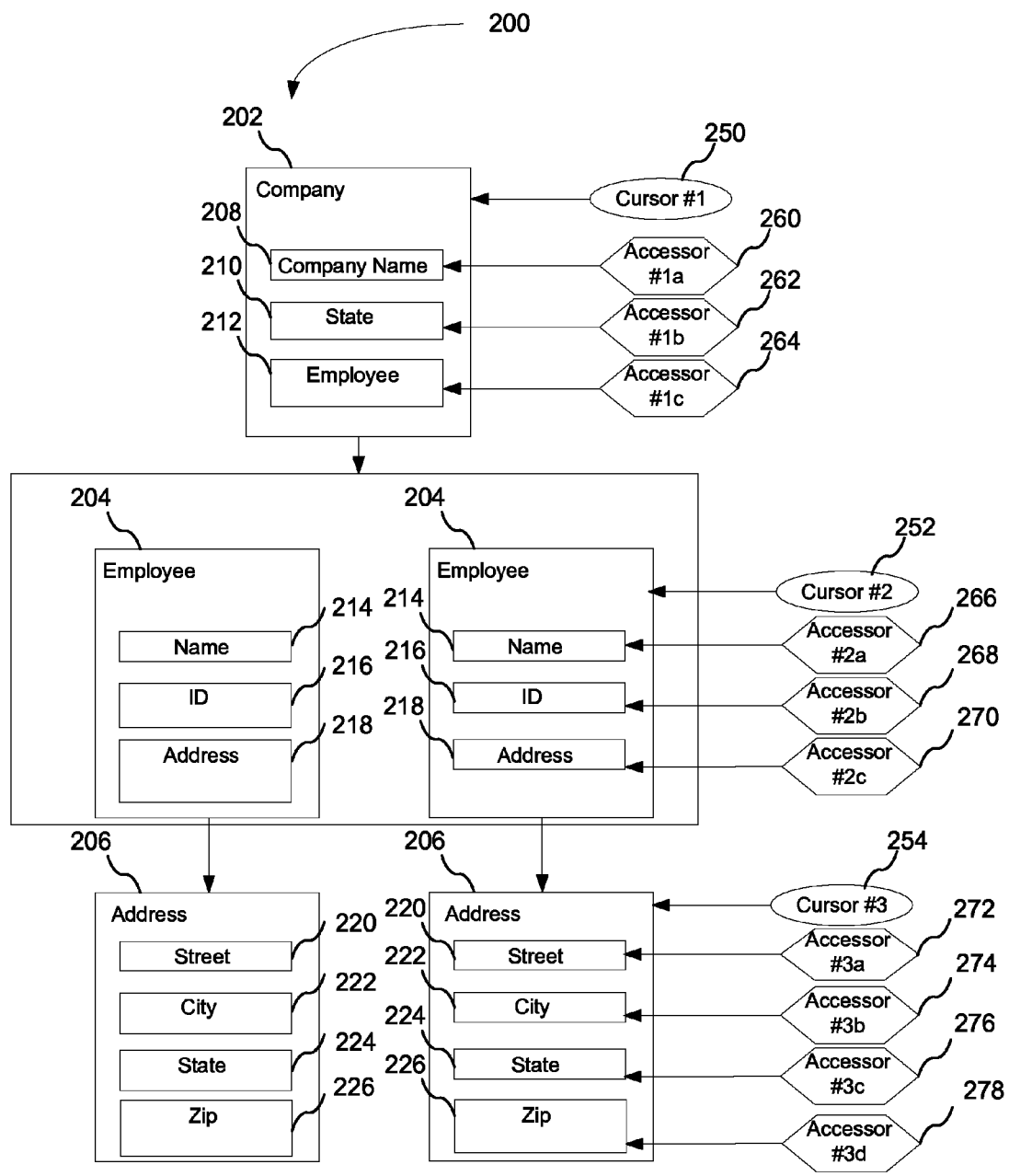

FIG. 2D illustrates advancing of the cursors and accessors illustrated in FIG. 2C. Cursors are advanced through these repeating elements whether reading or writing the data. When a cursor is advanced, the child cursors and the child accessors are repositioned to reference the corresponding child objects. The first cursor 250 is the top-level cursor and, therefore, remains pointing at the company object 202. To advance from the first employee to the second employee, the second cursor 252 is repositioned to point to the second employee object 204. Further, accessors corresponding to the second cursor 252 are also repositioned to point to the fields of the second employee object. In addition, the third cursor 254 is repositioned to point to the address object 206 associated with the second employee. The accessors corresponding to the third cursor 254 are also repositioned to point to the fields in the address object 206 associated with the second employee.

Each implementation of DESPI can readjust the cursor and accessors by whatever means is the most efficient for that specific implementation. As long as the accessor is pointing to the correct place in the bound data when the connector attempts to get and set the data, the integrity of the data will be maintained.

The accessor interface provides a one-way exchange of data. There is no data store behind the Accessor that permits navigation to read the data once it has been set. With DESPI, there is no object that can be passed around between components. The data is maintained by and accessible to only the endpoints of the data exchange.

Figure 3:
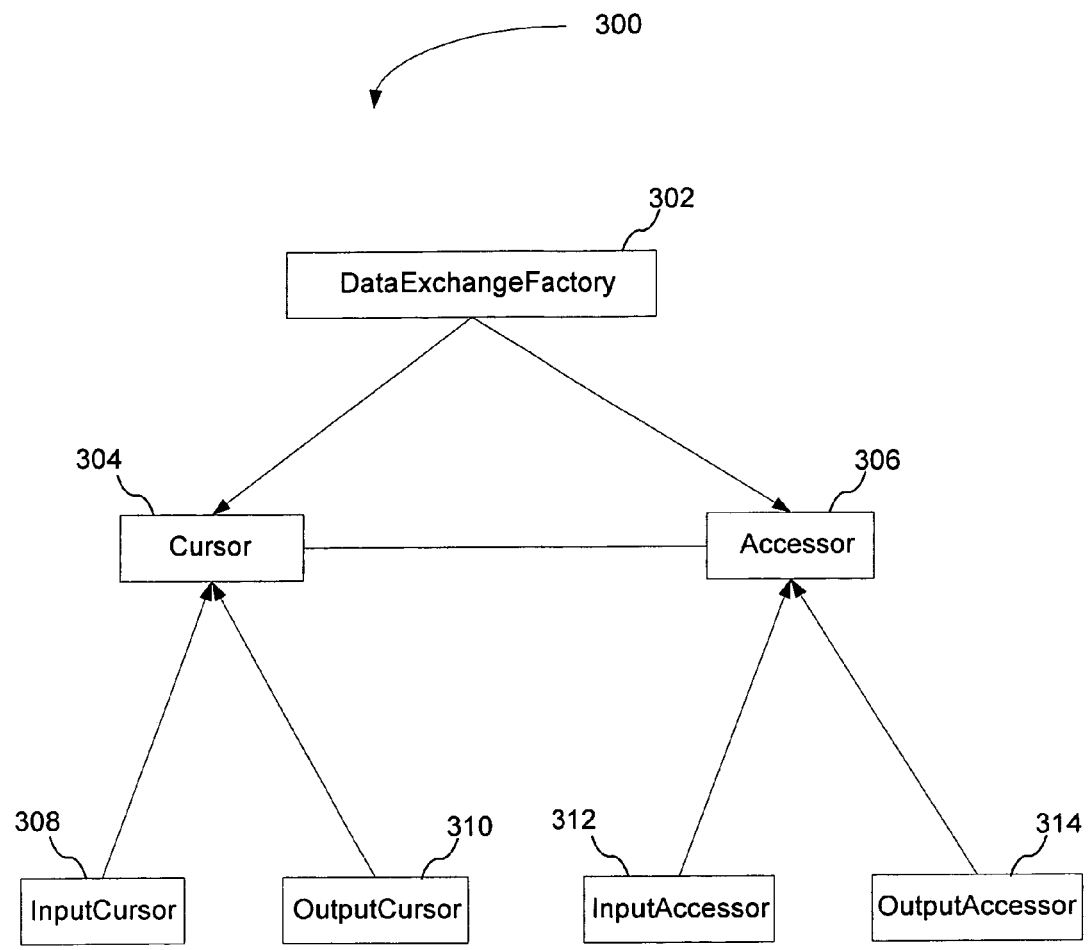
FIG. 3 illustrates an example of a DESPI configuration.

FIG. 3 illustrates an example of a DESPI configuration 300. The DESPI configuration 300 defines a plurality of interfaces: a DataExchangeFactory interface 302, a Cursor interface 304, an Accessor interface 306, an InputCursor interface 308, an OutputCursor interface 310, an InputAccessor interface 312, and an OutputAccessor interface 314. These interfaces are implemented by a runtime environment to map structured data of the adapter component 102, as shown in FIG. 1, to or from the runtime representation. The example illustrated in FIG. 3 is intended only as an example as a variety of interfaces may be utilized to implement the cursors and accessors described herein.

The DataExchangeFactory interface 302 is the interface that provides the factory methods for the creation of cursors and accessors to deal with the data in some format that this particular implementation of DataExchangeFactory understands. The DataExchangeFactory interface 302 is implemented by the data handling layer of the application component 108, and provides the mapping between the runtime format of data and the connector/record view of this data through the Cursor and Accessor interfaces.

With respect to the Cursor interface 304, the cursor instances are created based on the metadata describing the structure of the data, and are capable of advancing through the data when they point to objects with a cardinality greater than one. When the data is read, the cursor advances to the next element of the list. When the data is written a function in the DESPI configuration 300, the Cursor interface 304 creates storage for the next element. The Cursor interface 304 also maintains the parent and child relationship with other cursors and keeps the list of the Accessors that have been created to access fields of the complex object.

Further, the InputCursor interface 308 extends the Cursor interface 304 to add functions that are specific to reading input records. A top-level InputCursor will be created to process an input record. Any child cursors of this cursor will also be instances of InputCursor.

In addition, the OutputCursor interface 310 extends the Cursor interface 304 to add functions that are specific for writing output records. A top-level OutputCursor will be created to process an output record. Any child cursors of this cursor will also be instances of OutputCursor.

The Accessor interface 306 provides a mechanism to access individual fields of objects within a data set. Accessors may either be named or anonymous. A named accessor is created when a function for creating an InputAccessor or an OutputAccessor is called with a non-null name parameter. A named Accessor references a specific field of an object for its lifetime, i.e., it cannot be made to reference a different field. When such an accessor is created, a function may establish the context so that when the parent cursor is advanced, the accessor is efficiently updated to reference the same field in the subsequent object. Named accessors are utilized whenever the determination of which fields to access can be determined at initialization time, and whenever multiple records will be processed which contain the field referenced by the accessor.

An anonymous accessor is created when a function for creating an InputAccessor or an OutputAccessor is called with null for the name parameter. An anonymous Accessor is not associated with a particular field in an object, but can instead be dynamically associated with any field of the object. An adapter component 102, as shown in FIG. 1, may wish to use this approach if an object contains a large number of fields, and for performance reasons the adapter component 102 does not wish to create accessors for all of these objects. It may be more efficient for an adapter component 102 to create a single accessor and assign it to each field it wishes to access.

Further, the InputAccessor interface 312 extends the Accessor interface 306 to add methods that are specific for accessing data within input records. The InputAccessor interface 312 contains a large number of functions that provide typed access to data.

In addition, the OutputAccesor interface 314 extends the Accessor interface 306 to add functions that are specific for setting fields within output records. The OutputAccesor interface 314 contains a large number of methods that provide typed access to data.

Figure 4:
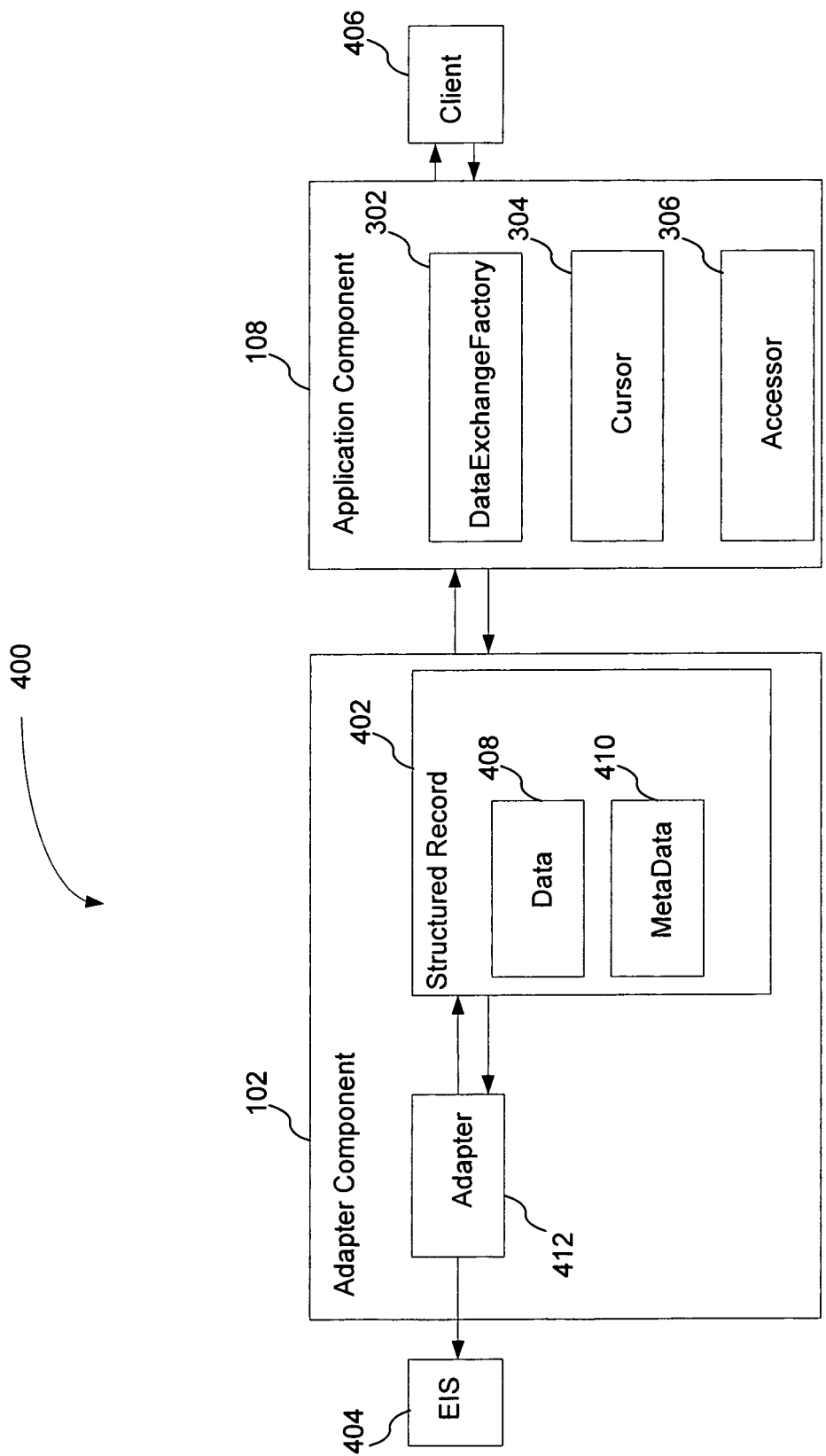
FIG. 4 illustrates a configuration that utilizes a structured record.

FIG. 4 illustrates a configuration 400 that utilizes a structured record 402. The structured record 402 is a representation of the adapter component data in the adapter component 102, which has an adapter 412. For example, the structured record may include data 408 and metadata 410. Accordingly, the structured record 402 may be utilized in the interaction between an EIS 404 and a client 406. The structured record 402 interacts with the DataExchangeFactory interface 302, the Cursor interface 304, and the Accessor interface 306 to provide structured access to the data in a format that the runtime expects. To utilize a StructuredRecord 402, the runtime will provide the DataExchangeFactory, Cursor, and Accessor. The StructuredRecord 402 is capable of calling to the Cursor interfaces 304 and the Accessor interfaces 306 to retrieve data coming in from the client 406, and to set data that is being retrieved from or published by the EIS system 404.

Figure 5:
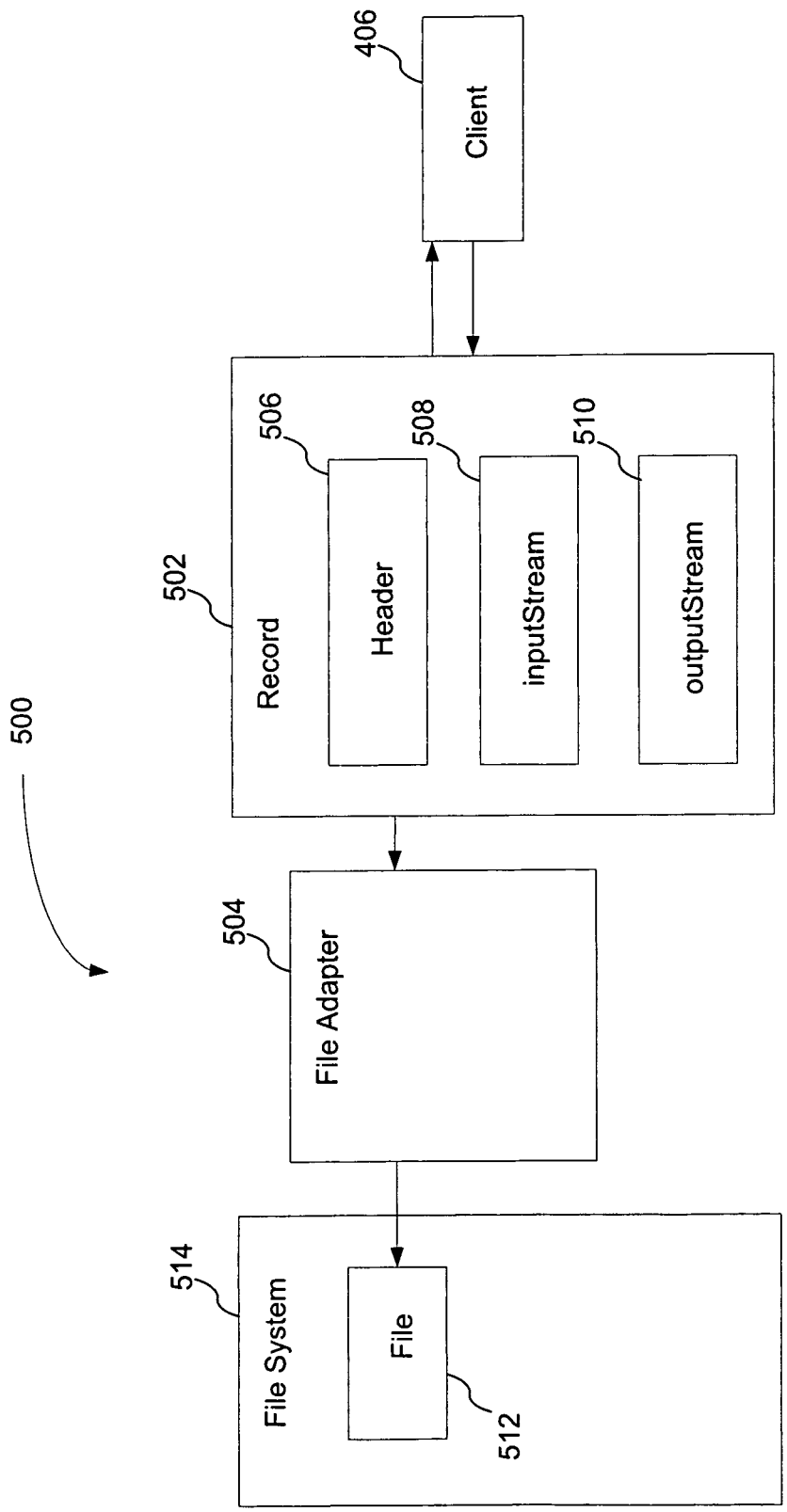
FIG. 5 illustrates a configuration that provides for streams.

FIG. 5 illustrates a configuration 500 that provides for streams. Streams allow for processing large amounts of data without having to read the entire data set into memory. DESPI allows for both InputStreams and OutputStreams to be passed as part of the record 502 to a file adapter 504, and to be returned as output. DESPI also allows the file adapter to publish streams as part of inbound communication. The record 502 may include a header 506, an inputStream 508, and an outputStream 510.

An OutputStreamRecord may be utilized as the output record from the adapter. It will contain an OutputStream 510 to which the client 406 can write. When an execute function is called, the adapter will create an OutputStream 510, attach it to the external resource, and return this stream as part of the output record. After this occurs, the client 406 may write to the stream.

An InputStreamRecord may be used as the input record, the output record, or both. When used as the input record, the file adapter 504 will read from the InputStream 508 and write to its external resource. For example, if the client 406 wants to write the byte stream "Hello World" to the external resource, the client 406 will create an InputStream 508, populated with this data, and pass it into the adapter as part of the input record.

When used as output, the adapter will connect the InputStream 508 of the output record to a stream in its external resource, allowing the client 406 to read from it. For example, if the client 406 wished to retrieve the contents of a file 512 from a file system 514, the file adapter 504 would pass a FileInputStream as part of the outputRecord to the client 406. The file adapter 504 may alternatively be a resource adapter that obtains resources for sources other than a file system.

The InputStreamRecord is also useful when publishing streams as inbound events. Utilizing the InputStreamRecord in this manner is very similar to using it as the output record. The listener, i.e., downstream application, will simply read from the inputStream when it receives the event.

Figure 6:
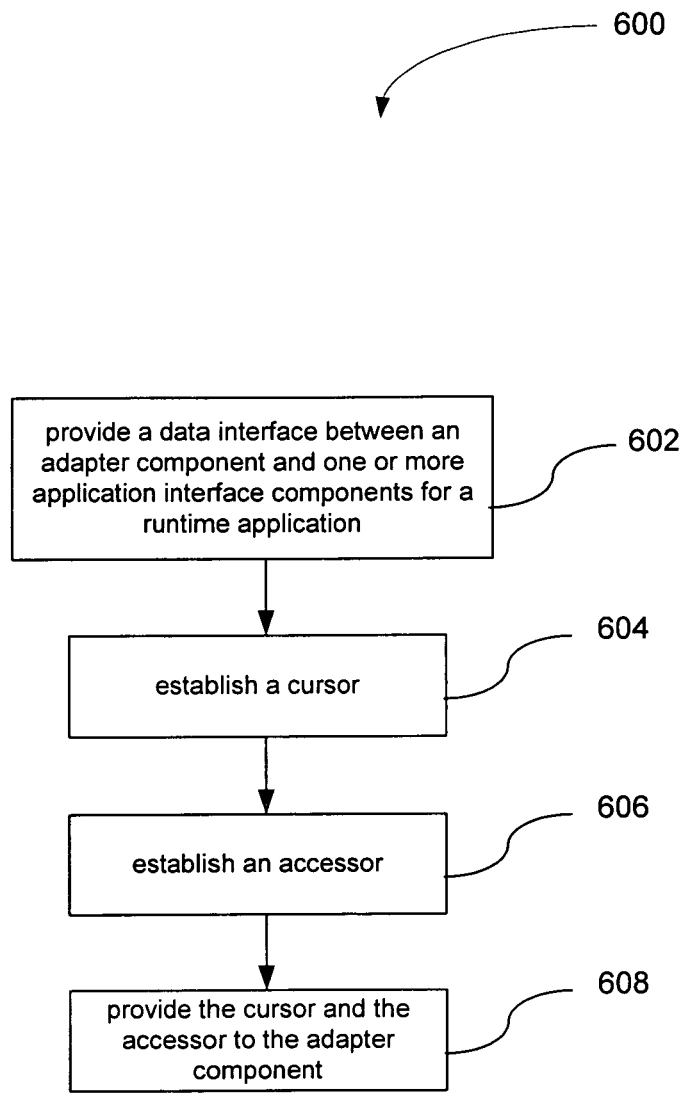
FIG. 6 illustrates a process that utilizes the DESPI.

FIG. 6 illustrates a process 600 that utilizes the DESPI. At a process block 602, the process 600 provides a data interface between an adapter component and one or more application interface components for a runtime application. Further, at a process block 604, the process 600 establishes a cursor that iterates over a plurality of data objects within a data set of the runtime application. In addition, at a process block 606, the process 600 establishes an accessor that provides access to a data element of the data object. Finally, at a process block 608, the process 600 provides the cursor and the accessor to the adapter component so that the adapter component accesses data through the one or more application interface components of the runtime application.

Figure 7:
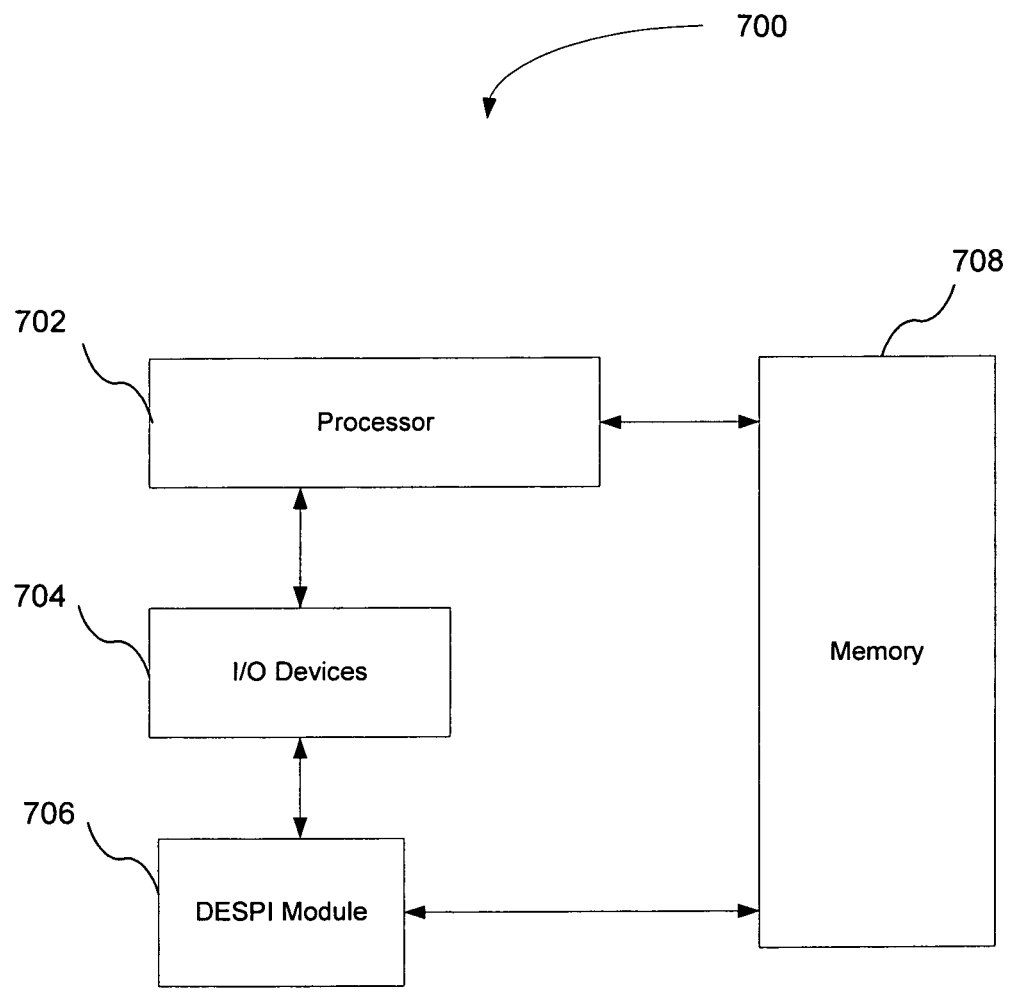
FIG. 7 illustrates a block diagram of a system that utilizes the DESPI.

FIG. 7 illustrates a block diagram of a system 700 that utilizes the DESPI. In one embodiment, the system 700 is suitable for storing and/or executing program code and is implemented using a general purpose computer or any other hardware equivalents. Thus, the system 700 comprises a processor 702, a memory 708, e.g., random access memory ("RAM") and/or read only memory ("ROM"), a DESPI module 706, and various input/output devices 704.

The processor 702 is coupled, either directly or indirectly, to the memory 708 through a system bus. The memory 708 can include local memory employed during actual execution of the program code, bulk storage, and/or cache memories which provide temporary storage of at least some program code in order to reduce the number of times code must be retrieved from bulk storage during execution.

The input/output devices 704 can be coupled directly to the system 700 or through intervening input/output controllers. Further, the input/output devices 704 can include a keyboard, a keypad, a mouse, a microphone for capturing speech commands, a pointing device, and other user input devices that will be recognized by one of ordinary skill in the art. Further, the input/output devices 704 can include a receiver, transmitter, speaker, display, image capture sensor, biometric sensor, etc. In addition, the input/output devices 704 can include storage devices such as a tape drive, floppy drive, hard disk drive, compact disk ("CD") drive, etc.

Network adapters may also be coupled to the system 700 to enable the system 700 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W"), and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

* IBM, WebSphere, WebSphere Business Monitor, WebSphere Integration Developer and WebSphere Process Server are registered trademarks of International Business Machines Corporation in the United States, other countries, or both.

We claim:

1. A computer program product comprising a computer readable storage device having a computer readable program stored thereon, wherein the computer readable program when executed on a computer causes the computer to:
provide a data interface between an adapter component and one or more application interface components for a runtime application;
establish a cursor that iterates over a first plurality of data objects within a data set of the runtime application and a child cursor that iterates over a second plurality of data objects, wherein each data object in the second plurality of data objects corresponds to a data object in the first plurality of data objects;
establish an accessor that provides access to a data element of a data object in the first plurality of data objects and a child accessor that provides access to a corresponding data element of a corresponding data object in the second plurality of data objects; and
provide the cursor, the child cursor, and the accessor to the adapter component so that the adapter component accesses data through the one or more application interface components of the runtime application, wherein, in response to the cursor iterating to point to a new data object in the first plurality of data objects, repositioning (1) the accessor to provide access to a data element of the new data object in the first plurality of data objects, (2) the child cursor to point to a new data object in the second plurality of data objects corresponding to the new data object in the first plurality of data objects, and (3) the child accessor to provide access to a corresponding data element of the new data object in the second plurality of data objects.

2. The computer program product of claim 1, wherein the one or more application interface components provide different formats for data in the runtime application.

3. The computer program product of claim 1, wherein the data element is a data field.

4. The computer program product of claim 1, wherein the data element is an array of data fields.

5. The computer program product of claim 1, wherein the data interface provides inbound and outbound data communication.

6. A method comprising:
providing a data interface between an adapter component and one or more application interface components for a runtime application;
establishing a cursor that iterates over a first plurality of data objects within a data set of the runtime application and a child cursor that iterates over a second plurality of data objects, wherein each data object in the second plurality of data objects corresponds to a data object in the first plurality of data objects;
establishing an accessor that provides access to a data element of a data object in the first plurality of data objects and a child accessor that provides access to a corresponding data element of a corresponding data object in the second plurality of data objects; and
providing the cursor, the child cursor, and the accessor to the adapter component so that the adapter component accesses data through the one or more application interface components of the runtime application, wherein, in response to the cursor iterating to point to a new data object, in the first plurality of data objects, repositioning (1) the accessor to provide access to a data element of the new data object in the first plurality of data objects, (2) the child cursor to point to a new data object in the second plurality of data objects corresponding to the new data object in the first plurality of data objects, and (3) the child accessor to provide access to a corresponding data element of the new data object in the second plurality of data objects.

7. The method of claim 6, wherein the one or more application interface components provide different formats for data in the runtime application.

8. The method of claim 6, wherein the data element is a data field.

9. The method of claim 6, wherein the data element is an array of data fields.

10. The method of claim 6, wherein the data interface provides inbound and outbound data communication.

11. A system comprising:
an adapter component;
one or more application interface components for a runtime application;
a processor; and
a storage device coupled to the processor, wherein the storage device stores program code, and wherein the processor is configured to execute the program code to perform operations, wherein the operations comprise:
providing a data interface between the adapter component and the one or more application interface components for a runtime application;
establishing a cursor that iterates over a first plurality of data objects within a data set of the runtime application and a child cursor that iterates over a second plurality of data objects, wherein each data object in the second plurality of data objects corresponds to a data object in the first plurality of data objects;
establishing an accessor that provides access to a data element of a data object in the first plurality of data objects and a child accessor that provides access to a corresponding data element of a corresponding data object in the second plurality of data objects; and
providing the cursor, the child cursor, and the accessor to the adapter component so that the adapter component accesses data through the one or more application interface components of the runtime application, wherein, in response to the cursor iterating to point to a new data object, in the first plurality of data objects, repositioning (1) the accessor to provide access to a data element of the new data object in the first plurality of data objects, (2) the child cursor to point to a new data object in the second plurality of data objects corresponding to the new data object in the first plurality of data objects, and (3) the child accessor to provide access to a corresponding data element of the new data object in the second plurality of data objects.

12. The system of claim 11, wherein the one or more application interface components provide different formats for data in the runtime application.

13. The system of claim 11, wherein the data element is a data field.

14. The system of claim 11, wherein the data element is an array of data fields.

15. The system of claim 11, wherein the data interface provides inbound and outbound data communication.

16. The system of claim 11, wherein the data is dynamically accessed.

17. The computer program product of claim 1, wherein a metadata tree includes at least one object from the first plurality of data objects and at least one object from the second plurality of data objects.

18. The computer program product of claim 1, wherein an anonymous accessor is created that is not associated with a particular data element of a data object in the first plurality of data objects.

19. The method of claim 6, wherein a metadata tree includes at least one object from the first plurality of data objects and at least one object from the second plurality of data objects.

20. The method of claim 6, wherein an anonymous accessor is created that is not associated with a particular data element of a data object in the first plurality of data objects.

21. The system of claim 11, wherein a metadata tree includes at least one object from the first plurality of data objects and at least one object from the second plurality of data objects.

22. The system of claim 11, wherein an anonymous accessor is created that is not associated with a particular data element of a data object in the first plurality of data objects.

* * * * *